US010783736B1

(12) United States Patent
Herrington et al.

(10) Patent No.: US 10,783,736 B1
(45) Date of Patent: *Sep. 22, 2020

(54) TAP TO COPY DATA TO CLIPBOARD VIA NFC

(71) Applicant: Capital One Services, LLC, McLean, VA (US)

(72) Inventors: Daniel Herrington, New York, NY (US); Jeffrey Rule, Chevy Chase, MD (US); Colin Hart, Arlington, VA (US); Jason Ji, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,380

(22) Filed: Jul. 25, 2019

Related U.S. Application Data

(63) Continuation of application No. 16/359,966, filed on Mar. 20, 2019, now Pat. No. 10,438,437.

(51) Int. Cl.
| | |
|---|---|
| *G07F 7/08* | (2006.01) |
| *G06Q 20/32* | (2012.01) |
| *G06F 9/54* | (2006.01) |
| *H04W 4/80* | (2018.01) |

(52) U.S. Cl.
CPC .......... *G07F 7/0893* (2013.01); *G06F 9/543* (2013.01); *G06Q 20/322* (2013.01); *G07F 7/084* (2013.01); *G07F 7/0813* (2013.01); *H04W 4/80* (2018.02)

(58) Field of Classification Search
CPC ...... G07F 7/0893; G07F 7/084; G07F 7/0813; G06Q 20/322; G06F 9/543; H04W 4/80
See application file for complete search history.

(56) References Cited

U.S. PATENT DOCUMENTS

| | | | |
|---|---|---|---|
| 4,827,113 | A | 5/1989 | Rikuna |
| 4,910,773 | A | 3/1990 | Hazard et al. |
| 5,036,461 | A | 7/1991 | Elliott et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Daniel I Walsh

(57) ABSTRACT

Various embodiments are generally directed to copying data to a clipboard of a mobile device from a contactless card using NFC. A mobile device may issue a request to read data from the contactless card. The contactless card may generate encrypted data in response to the request. The mobile device may receive the encrypted data via NFC and transmit the encrypted data to a server for verification. The server may verify the encrypted data and transmit an indication of an account number for the contactless card to the mobile device. The mobile device may then copy the account number to a clipboard of the mobile device.

20 Claims, 11 Drawing Sheets

(56) References Cited

U.S. PATENT DOCUMENTS

| | | |
|---|---|---|
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,559,872 B2 | 10/2013 | Butler |
| 8,566,916 B1 | 10/2013 | Bailey et al. |
| 8,567,670 B2 | 10/2013 | Stanfield et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |

(56) References Cited

U.S. PATENT DOCUMENTS

| | | | |
|---|---|---|---|
| 8,750,514 B2 | 6/2014 | Gallo et al. | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,111,193 B2 * | 8/2015 | Poole | G06Q 20/3226 |
| 9,118,663 B1 | 8/2015 | Bailey et al. | |
| 9,122,964 B2 | 9/2015 | Krawczewicz | |
| 9,129,280 B2 | 9/2015 | Bona et al. | |
| 9,152,832 B2 | 10/2015 | Royston et al. | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,306,626 B2 | 4/2016 | Hall et al. | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,743,643 B1 * | 8/2017 | Kaplan | A01K 11/008 |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,940,571 B1 | 4/2018 | Herrington | |
| 9,953,323 B2 | 4/2018 | Candelore et al. | |
| 9,961,194 B1 | 5/2018 | Wiechman et al. | |
| 9,965,756 B2 | 5/2018 | Davis et al. | |
| 9,965,911 B2 | 5/2018 | Wishne | |
| 9,978,058 B2 | 5/2018 | Wurmfeld et al. | |
| 10,009,177 B2 * | 6/2018 | Hammad | H04L 63/0853 |
| 10,043,164 B2 | 8/2018 | Dogin et al. | |
| 10,070,310 B2 * | 9/2018 | Powell | H04W 12/0023 |
| 10,075,437 B1 | 9/2018 | Costigan et al. | |
| 10,129,648 B1 | 11/2018 | Hernandez et al. | |
| 10,133,979 B1 | 11/2018 | Eidam et al. | |
| 10,217,105 B1 | 2/2019 | Sangi et al. | |
| 10,270,587 B1 * | 4/2019 | Wu | H04L 9/008 |
| 10,438,437 B1 * | 10/2019 | Herrington | G06Q 20/3278 |
| 10,467,622 B1 * | 11/2019 | Rule | G06Q 20/352 |
| 10,489,781 B1 * | 11/2019 | Osborn | H04L 9/0822 |
| 10,528,944 B2 * | 1/2020 | Khan | G06Q 20/40 |
| 10,535,062 B1 * | 1/2020 | Rule | G06Q 20/4014 |
| 10,636,241 B1 * | 4/2020 | Rule | G06Q 20/352 |
| 2001/0010723 A1 | 8/2001 | Pinkas | |
| 2001/0029485 A1 | 10/2001 | Brody et al. | |
| 2001/0034702 A1 | 10/2001 | Mockett et al. | |
| 2001/0054003 A1 | 12/2001 | Chien et al. | |
| 2002/0078345 A1 | 6/2002 | Sandhu et al. | |
| 2002/0093530 A1 | 7/2002 | Krothapalli et al. | |
| 2002/0100808 A1 | 8/2002 | Norwood et al. | |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2003/0034873 A1 | 2/2003 | Chase et al. | |
| 2003/0055727 A1 | 3/2003 | Walker et al. | |
| 2003/0078882 A1 | 4/2003 | Sukeda et al. | |
| 2003/0208449 A1 | 11/2003 | Diao | |
| 2004/0039919 A1 | 2/2004 | Takayama et al. | |
| 2004/0127256 A1 | 7/2004 | Goldthwaite et al. | |
| 2004/0215674 A1 | 10/2004 | Odinak et al. | |
| 2004/0215963 A1 * | 10/2004 | Kaplan | H04L 63/0428 713/172 |
| 2004/0230799 A1 | 11/2004 | Davis | |
| 2005/0075985 A1 | 4/2005 | Cartmell | |
| 2005/0081038 A1 | 4/2005 | Arditti Modiano et al. | |
| 2005/0156026 A1 | 7/2005 | Ghosh et al. | |
| 2005/0195975 A1 | 9/2005 | Kawakita | |
| 2005/0247797 A1 | 11/2005 | Ramachandran | |
| 2006/0006230 A1 | 1/2006 | Bear et al. | |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0280338 A1 | 12/2006 | Rabb | |
| 2007/0033642 A1 | 2/2007 | Ganesan et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118745 A1 | 5/2007 | Buer | |
| 2007/0197261 A1 | 8/2007 | Humbel | |
| 2007/0224969 A1 | 9/2007 | Rao | |
| 2007/0241182 A1 | 10/2007 | Buer | |
| 2007/0258594 A1 | 11/2007 | Sandhu et al. | |
| 2007/0276765 A1 * | 11/2007 | Hazel | G06F 21/72 705/71 |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0086767 A1 | 4/2008 | Kulkarni et al. | |
| 2008/0103968 A1 | 5/2008 | Bies et al. | |
| 2008/0109309 A1 | 5/2008 | Landau et al. | |
| 2008/0110983 A1 | 5/2008 | Ashfield | |
| 2008/0120711 A1 | 5/2008 | Dispensa | |
| 2008/0156873 A1 | 7/2008 | Wilhelm et al. | |
| 2008/0162312 A1 | 7/2008 | Sklovsky et al. | |
| 2008/0164308 A1 | 7/2008 | Aaron et al. | |
| 2008/0189214 A1 * | 8/2008 | Mueller | G06Q 20/20 705/65 |
| 2008/0207307 A1 | 8/2008 | Cunningham, II et al. | |
| 2008/0209543 A1 | 8/2008 | Aaron | |
| 2008/0223918 A1 | 9/2008 | Williams et al. | |
| 2008/0285746 A1 | 11/2008 | Landrock et al. | |
| 2008/0308641 A1 | 12/2008 | Finn | |

(56) References Cited

U.S. PATENT DOCUMENTS

| | | |
|---|---|---|
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0170559 A1* | 7/2009 | Phillips ............... H01Q 1/44 455/556.1 |
| 2009/0171682 A1 | 7/2009 | Dixon et al. |
| 2009/0172581 A1* | 7/2009 | Burling ............. G06F 3/0481 715/770 |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2010/0317420 A1* | 12/2010 | Hoffberg ............. G07F 17/323 463/1 |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0307710 A1 | 12/2011 | McGuire et al. |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0284194 A1 | 11/2012 | Liu et al. |
| 2012/0290472 A1* | 11/2012 | Mullen ............. G06Q 10/00 705/39 |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0018738 A1* | 1/2013 | Faires ................ G06Q 20/36 705/16 |
| 2013/0026229 A1 | 1/2013 | Jarman et al. |
| 2013/0041746 A1* | 2/2013 | Hollander ........... G06Q 20/325 705/14.38 |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0091351 A1* | 4/2013 | Manges ............. H04L 63/0442 713/153 |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0152185 A1* | 6/2013 | Singh ................ G06Q 20/36 726/9 |
| 2013/0159008 A1* | 6/2013 | Mills ................ G06Q 10/06 705/2 |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0214042 A1* | 8/2013 | Kingston ............. G06Q 20/40 235/379 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1* | 5/2014 | Khalid ................ G06Q 20/352 235/380 |
| 2014/0165607 A1* | 6/2014 | Alexander ......... A47G 19/2288 62/3.3 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0345534 A1* | 11/2014 | Rhee .................. A01K 5/0114 119/61.5 |
| 2014/0346860 A1 | 11/2014 | Aubry et al. |

(56) References Cited

U.S. PATENT DOCUMENTS

| | | | |
|---|---|---|---|
| 2014/0358777 A1* | 12/2014 | Gueh | G06Q 20/1085 |
| | | | 705/43 |
| 2014/0365780 A1 | 12/2014 | Movassaghi | |
| 2014/0372371 A1* | 12/2014 | McCann | G06Q 10/10 |
| | | | 707/609 |
| 2014/0379361 A1 | 12/2014 | Mahadkar et al. | |
| 2015/0012444 A1 | 1/2015 | Brown et al. | |
| 2015/0019442 A1 | 1/2015 | Hird et al. | |
| 2015/0032635 A1 | 1/2015 | Guise | |
| 2015/0089586 A1 | 3/2015 | Ballesteros | |
| 2015/0112868 A1* | 4/2015 | Swamy | G07F 7/0873 |
| | | | 705/65 |
| 2015/0134452 A1 | 5/2015 | Williams | |
| 2015/0134536 A1* | 5/2015 | Li | G06Q 20/3229 |
| | | | 705/66 |
| 2015/0170138 A1 | 6/2015 | Rao | |
| 2015/0178724 A1 | 6/2015 | Ngo et al. | |
| 2015/0205379 A1 | 7/2015 | Mag et al. | |
| 2015/0235256 A1* | 8/2015 | Barsoum | G06Q 20/02 |
| | | | 705/14.33 |
| 2015/0302409 A1 | 10/2015 | Malek et al. | |
| 2015/0317626 A1 | 11/2015 | Ran et al. | |
| 2015/0332266 A1 | 11/2015 | Friedlander et al. | |
| 2015/0339474 A1 | 11/2015 | Paz et al. | |
| 2015/0356560 A1* | 12/2015 | Shastry | G06Q 20/38215 |
| | | | 705/64 |
| 2015/0371234 A1 | 12/2015 | Huang et al. | |
| 2016/0012465 A1 | 1/2016 | Sharp | |
| 2016/0019536 A1* | 1/2016 | Ortiz | G06Q 20/3227 |
| | | | 705/67 |
| 2016/0026997 A1 | 1/2016 | Tsui et al. | |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0087957 A1 | 3/2016 | Shah et al. | |
| 2016/0092696 A1 | 3/2016 | Guglani et al. | |
| 2016/0148193 A1 | 5/2016 | Kelley et al. | |
| 2016/0232523 A1 | 8/2016 | Venot et al. | |
| 2016/0232600 A1* | 8/2016 | Purves | G06Q 30/0641 |
| 2016/0239672 A1 | 8/2016 | Khan et al. | |
| 2016/0253651 A1 | 9/2016 | Park et al. | |
| 2016/0255072 A1 | 9/2016 | Liu | |
| 2016/0267486 A1 | 9/2016 | Mitra et al. | |
| 2016/0267511 A1* | 9/2016 | Bartholomew | G06Q 30/0214 |
| 2016/0277383 A1 | 9/2016 | Guyomarc'h et al. | |
| 2016/0277388 A1 | 9/2016 | Lowe et al. | |
| 2016/0283933 A1* | 9/2016 | Orlando | G06Q 20/204 |
| 2016/0307187 A1 | 10/2016 | Guo et al. | |
| 2016/0307189 A1 | 10/2016 | Zarakas et al. | |
| 2016/0308371 A1* | 10/2016 | Locke | H02J 50/001 |
| 2016/0314472 A1 | 10/2016 | Ashfield | |
| 2016/0314501 A1* | 10/2016 | Bartholomew | G06Q 30/0275 |
| 2016/0321653 A1 | 11/2016 | Jacobs et al. | |
| 2016/0330027 A1 | 11/2016 | Ebrahimi | |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Schipperheijn | |
| 2017/0064554 A1* | 3/2017 | Li | H04W 12/0608 |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0118201 A1* | 4/2017 | Hoyer | H04W 12/06 |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1* | 9/2018 | Caterino | H04L 63/08 |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0392666 A1* | 12/2019 | Osborn | G06Q 20/385 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2010089458 A1 | 8/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

(56) References Cited

OTHER PUBLICATIONS

Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_201206070619239900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Levin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa, 10 pages.
Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.

(56) References Cited

OTHER PUBLICATIONS

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Application No. PCT/US2020/022593 dated May 15, 2020, 12 pages.

\* cited by examiner

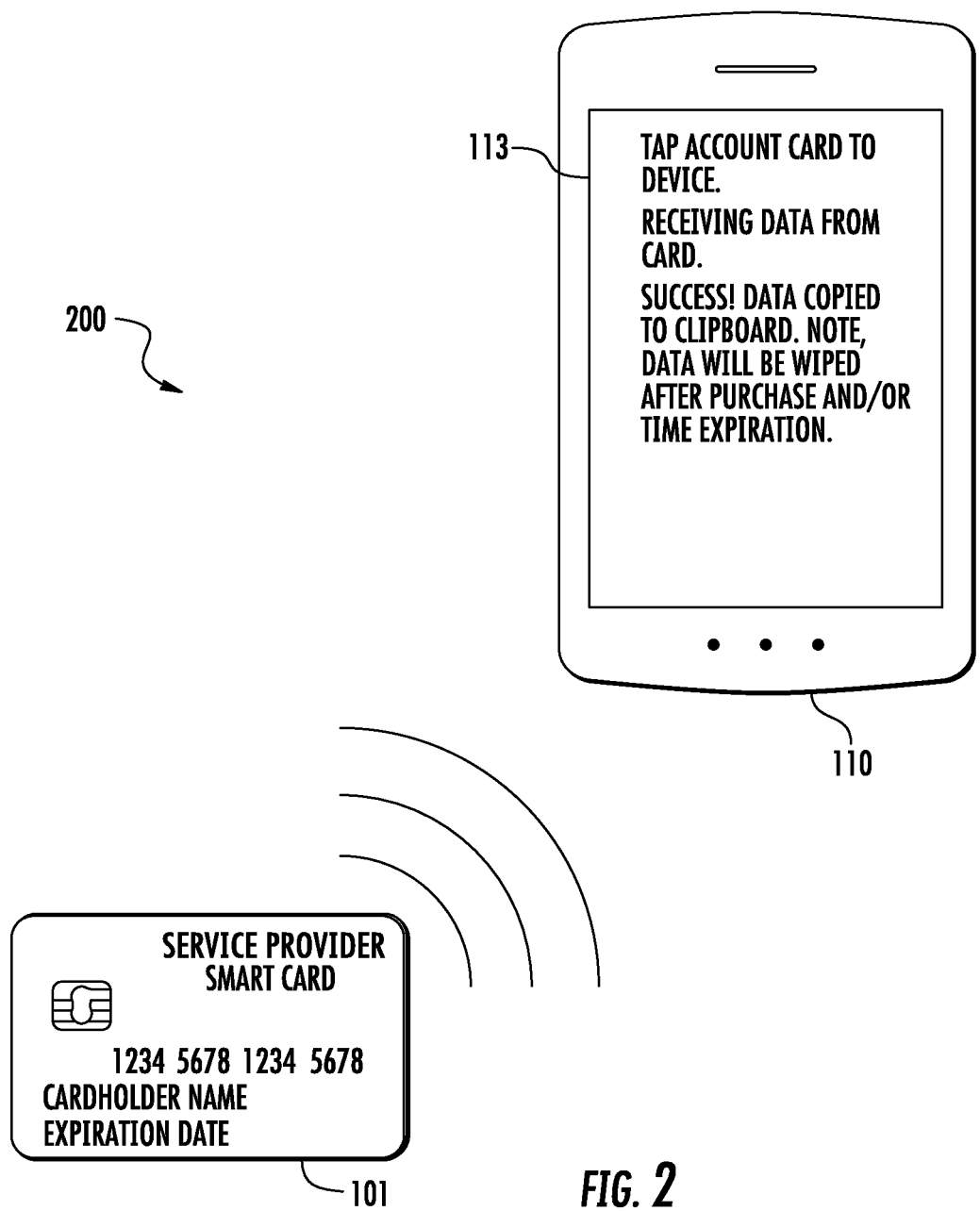

US 10,783,736 B1

TAP TO COPY DATA TO CLIPBOARD VIA NFC

RELATED APPLICATIONS

This application is a continuation of U.S. patent application Ser. No. 16/359,966, entitled "TAP TO COPY DATA TO CLIPBOARD VIA NFC" filed on Mar. 20, 2019. The contents of the aforementioned application are incorporated herein by reference.

TECHNICAL FIELD

Embodiments herein generally relate to mobile computing platforms, and more specifically, to tap to copy data to a clipboard via near-field communication (NFC).

BACKGROUND

Account identifiers for payment cards are often long numeric and/or character strings. As such, it is difficult for a user to manually enter the account identifier correctly. Indeed, users often make mistakes and enter incorrect account numbers into computing interfaces (e.g., payment interfaces). Furthermore, even if the user enters the correct account identifier, processes have been developed that allow cameras to capture the account identifier.

SUMMARY

Embodiments disclosed herein provide systems, methods, articles of manufacture, and computer-readable media for tapping to copy data to a clipboard via NFC. According to one example, an application may receive encrypted data from a communications interface of a contactless card associated with an account, the encrypted data generated based on one or more cryptographic algorithms and a diversified key, the diversified key stored in a memory of the contactless card and generated based on a master key and a counter value stored in the memory of the contactless card. The application may then receive, from a server, verification of the encrypted data, the server to decrypt the encrypted data based on one or more cryptographic algorithms and the diversified key stored in a memory of the server to verify the encrypted data, the diversified key stored in the memory of the server generated based on a master key and a counter value stored in the memory of the server. The application may further receive, from the server, an encrypted account number associated with the account. The application may decrypt the encrypted account number to yield the account number. The application may then copy the account number to a clipboard of an operating system (OS) executing on the processor circuit.

BRIEF DESCRIPTION OF THE DRAWINGS

FIG. 2 illustrates an embodiment of tapping to copy data to a clipboard via NFC.

DETAILED DESCRIPTION

Figure 1A:
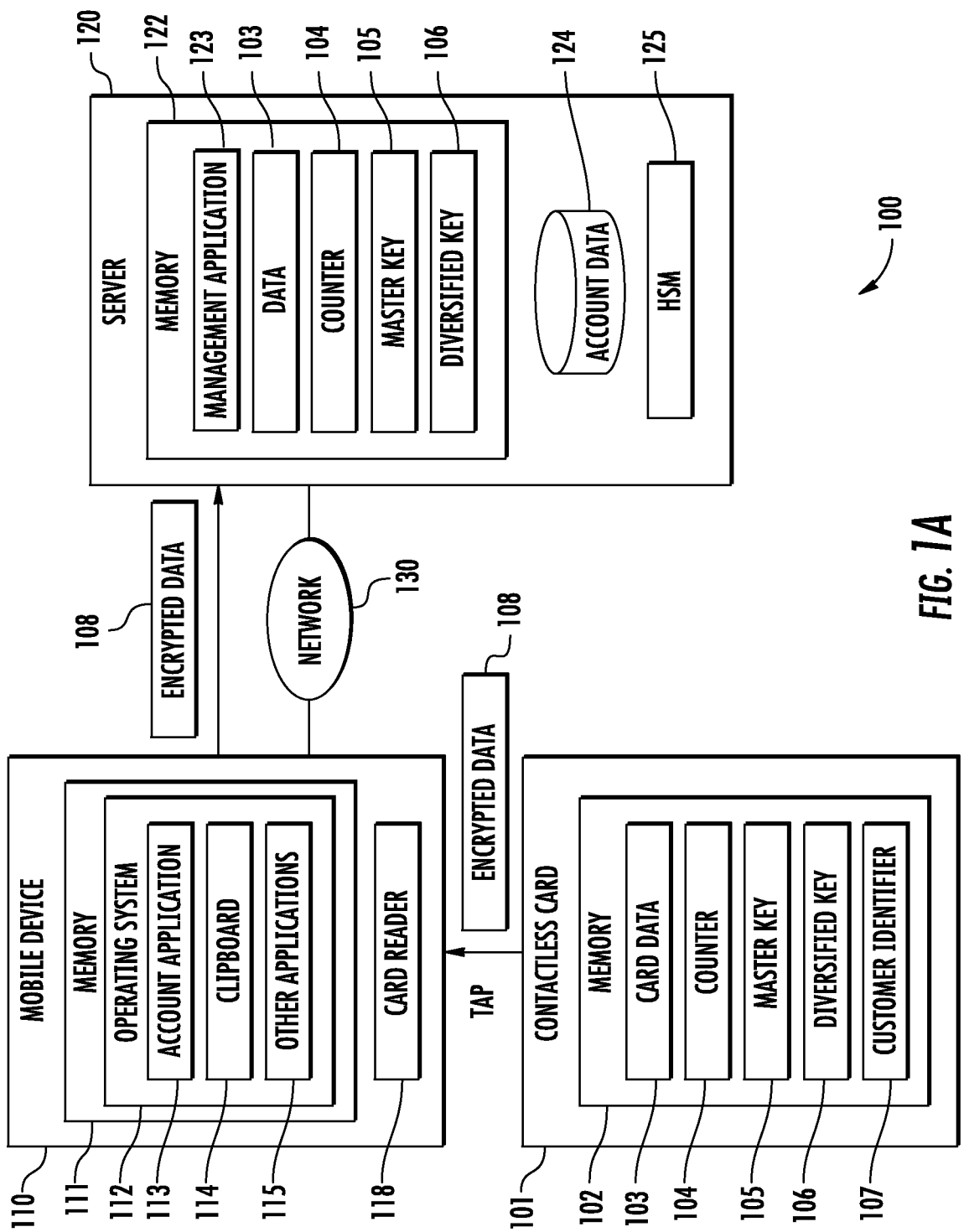
FIGS. 1A-1B illustrate embodiments of a system for tapping to copy data to a clipboard via NFC.

Embodiments disclosed herein provide secure techniques for copying data (e.g., an account number) from a contactless card to the clipboard of a computing device using NFC. Generally, a user of a device may provide input to an application specifying to copy the data from the contactless card. The contactless card may then come into NFC communications range with the device, e.g., via a tapping gesture. The application may then instruct the contactless card to generate and transmit data to the application via NFC. The data generated by the contactless card may be encrypted using key diversification. The application may transmit the data received from the contactless card to a server for verification. Upon verifying the data, the server may transmit account data (e.g., an account number) to the application on the device, which may then copy the received account data to a clipboard of the operating system of the device. The account data may be maintained on the clipboard until a purchase is made, or the expiration of a time threshold, at which point the clipboard contents may be wiped, overwritten, or otherwise modified. Advantageously, doing so improves security of all devices and associated data.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication, or using NFC Data Exchange Format (NDEF) tags. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 102 of the contactless card 101 includes data 103, a counter 104, a master key 105, a diversified key 106, and a unique customer identifier 107. The data 103 generally includes any data that can be copied to the clipboard 114 such as characters, text, executable code, images, or other types of data objects. In one embodiment, the data 103 may comprise an account number, expiration date, and card verification value (CVV) associated with the contactless card 101. The account number may be any type of account number, such as a primary account number (PAN), a virtual account number, and/or a token generated based on the PAN. Other types of account numbers are contemplated, and the use of any particular type of account number as examples herein should not be considered limiting of the disclosure. The data 103 may further include names, billing addresses, shipping addresses, usernames and/or passwords, one-time use codes for multi-factor authentication, personalized uniform resource locators (URLs), gift card numbers, drivers license information, passport information, loyalty program information, loyalty points, phone numbers, email addresses, contact information, access information, and the like. Other types of data 103 are contemplated, and the use of any type of data 103 as examples herein should not be considered limiting of the disclosure.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113, a clipboard 114, and one or more other applications 115. The account application 113 allows users to perform various account-related operations, such as viewing account balances and processing payments as described in greater detail below. Initially, a user must authenticate using authentication credentials to access the account application. For example, the authentication credentials may include a username and password, biometric credentials, and the like. The clipboard 114 stores data that can be copied and/or pasted within the OS 112. For example, as discussed in greater detail below, an account number of an account associated with a contactless card 101 (e.g., a portion of the data 103) may be programmatically copied to the clipboard 114 in a secure manner using a command and/or gesture available within the OS 112. The account number may then be pasted from the clipboard 114 to the account application 113, other applications 115, and/or other components of the OS 112 using a command and/or gesture available within the OS 112. In at least one embodiment, the clipboard 114 includes a single data field for all elements of the data 103. In other embodiments, the clipboard 114 includes multiple data fields, with at least one field for each element of the data 103 (e.g., a field for an account number, a field for an expiration date, a field for a CVV number, a field for a first name, and a field for a last name, etc.).

As shown, the server 120 includes a data store of account data 124 and a memory 122. The account data 124 includes account-related data for a plurality of users and/or accounts. The account data 124 may include at least a master key 105, counter 104, a customer ID 107, an associated contactless card 101, and biographical information for each account. The memory 122 includes a management application 123 and instances of the data 103, the counter 104, master key 105, and diversified key 106 for one or more accounts from the account data 124.

Generally, the system 100 is configured to implement key diversification to secure data. The server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (or stored in a different secure location). The master key may be kept secret from all parties other than the contactless card 101 and server 120, thereby enhancing security of the system 100. Other examples of key diversification techniques are described in U.S. patent application Ser. No. 16/205,119, filed Nov. 29, 2018. The aforementioned patent application is incorporated by reference herein in its entirety.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 of the mobile device 110. Card reader 118 may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. After communication has been established between client device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. However, in some embodiments, the mobile device 110 may verify the MAC cryptogram.

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data to the account application 113 of the mobile device 110 (e.g., via an NFC connection, Bluetooth connection, etc.). The account application 113 of the mobile device 110 may then transmit the encrypted data to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Upon receiving the data, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted data received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account.

Although the counter 104 is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In some examples, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, data such as the data 103 of the contactless card 101 and/or the server 120 may securely be copied to the clipboard 114. In some embodiments, one or more data elements of the data 103 are received directly from the contactless card 101 and copied to the clipboard. For example, the account number, expiration date, and CVV of the contactless card 101 may be received from the data 103 in one or more data packages from the contactless card 101. In some embodiments, the contactless card 101 may encrypt the requested elements of data 103 and transmit a data package comprising the encrypted data 103 that can be parsed by the account application 113 and copied to the clipboard 114 responsive to receiving an indication of successful authentication of encrypted data generated by the contactless card 101 (e.g., by the server 120). In other embodiments, the server 120 may authenticate encrypted data generated by the contactless card 101 and transmit data 103 stored in the server 120 in one or more data packages to the account application 113 which may copy the data 103 received from the server 120 to the clipboard 114. In embodiments where the data 103 is transmitted to the mobile device 110 in a single package (e.g., from the card 101 and/or the server 120), the single data package may include delimiters and or metadata that allow the account application 113 to parse and extract each element of data 103 (e.g., account number, expiration date, CVV, billing address, and/or shipping address).

For example, a user of the account application 113 may specify to copy data to the clipboard 114. In response, the account application 113 may instruct the user to tap the contactless card 101 to the mobile device 110. Doing so causes the account application 113 to generate and transmit an indication to the contactless card 101 to generate an encrypted data 108. In response, the contactless card 101 increments the counter value 104 and provides the master key 105 and counter value 104 as input to a cryptographic algorithm, which produces a diversified key 106 as output. The contactless card 101 may then encrypt the customer identifier 107 using the diversified key 106 to generate the encrypted data 108. As stated, in some embodiments, the contactless card 101 may further encrypt the data 103 and include the encrypted data 103 as part of the encrypted data 108. The contactless card 101 may then transmit the encrypted data 108 to the account application 113 of the mobile device 110 (e.g., via an NFC connection, Bluetooth connection, etc.). The account application 113 of the mobile device 110 may then transmit the encrypted data 108 to the server 120 via the network 130. In at least one embodiment, the contactless card 101 transmits the counter value 104 along with the encrypted data 108.

Upon receipt of the encrypted data 108, the management application 123 of the server 120 may verify the encrypted data 108 using key diversification. As stated, the management application 123 of the server 120 may perform the same symmetric encryption using the counter value 104 as input to the encryption, and the master key 105 as the key for the encryption, to generate the diversified key 106. The management application 123 may then decrypt the encrypted data 108 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account, where a match of the customer ID values verifies the encrypted data received from the contactless card 101.

If the management application 123 successfully verifies the encrypted data 108, the management application 123 may transmit an indication of the verification to the account application 113. As stated, in some embodiments, the encrypted data 108 generated by the contactless card 101 may include the data 103. Therefore, responsive to receiving the indication of verification from the management application 123, the account application 113 decrypts and parses the encrypted data 108 received from the contactless card 101 to copy the decrypted data 103 to the clipboard 114. As stated, in some embodiments, management application 123 may further transmit the requested data 103 from the server 120 to the account application 113. In such embodiments, the account application 113 may copy the data 103 received from the server 120 to the clipboard 114.

In at least one embodiment, a time threshold may be applied to a request to copy data to the clipboard 114. In such embodiments, the account application 113 may notify the server 120 that a request to copy data to the clipboard 114 has been initiated. The server 120 may then start a timer. If the timer value exceeds the time threshold, the server 120 may refrain from validating the encrypted data 108, refrain from transmitting an indication of validation of the encrypted data 108, and/or refrain from transmitting data 103 from the server 120 to the account application 113. For example, if the server 120 receives the encrypted data 108 from the contactless card 101 via the mobile device 110 15 seconds after starting the timer, and the time threshold is 30 seconds, the server 120 may validate the encrypted data 108 and transmit the data 103 from the server 120 to the mobile device 110. If, however, the server 120 receives the encrypted data 108 from the contactless card 101 via the mobile device 110 45 seconds after starting the timer, the server 120 may refrain from validating the encrypted data 108 and transmit a failure state to the account application 113, which may refrain from copying data to the clipboard 114.

Figure 1B:
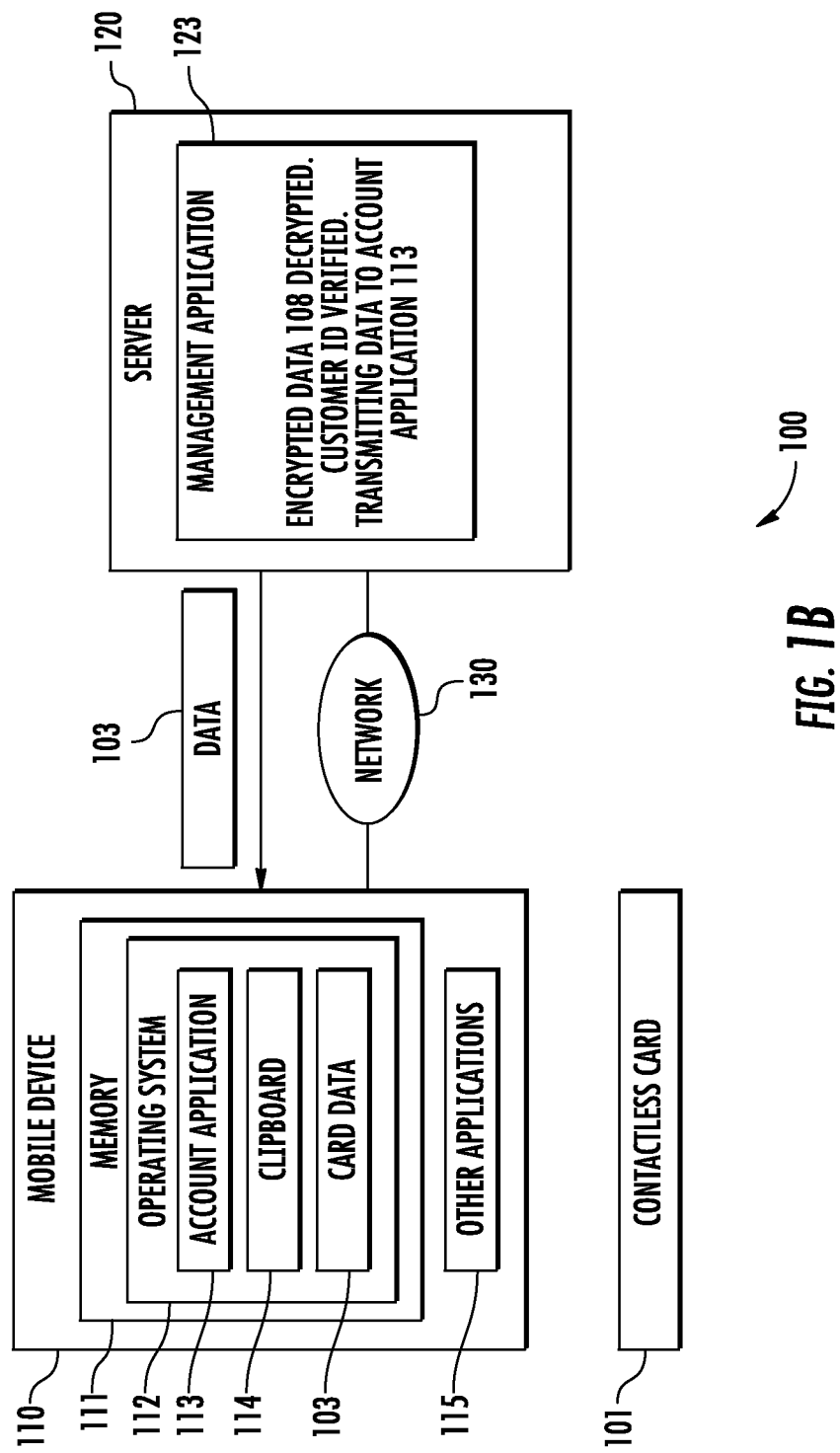

FIG. 1B depicts a result of the verification process performed by the management application 123. As shown, after verifying the encrypted data 108, the management application 123 of the server 120 transmits the data 103 from the server 120 to the mobile device 110. In at least one embodiment, the management application 123 encrypts the data 103 before sending to the account application 113. As stated, the data 103 may include the account number, CVV, expiration date, and/or billing address of the contactless card 101. Furthermore, as stated, the account number may comprise a single-use virtual account number. The account application 113 may then receive the data 103 and decrypt the received data 103 if the data 103 has been encrypted. The account application 113 may then programmatically write the data 103 to the clipboard 114 without requiring user input and without exposing the data 103. For example, the OS 112 may provide an application programming interface (API) for copying data to the clipboard 114. Therefore, the account application 113 may make a call to the API which includes the data 103 to be copied to the clipboard 114. A result of the API call may copy the provided data 103 to the clipboard 114. As another example, the account application 113 may directly copy the data 103 to the clipboard using one or more code statements supported by the OS 112. Once copied to the clipboard 114, the user may easily paste the data 103 from the clipboard 114 to other targets within the OS 112 using a command and/or gesture available within the OS 112.

In some embodiments, the data 103 copied to the clipboard 114 all relevant information (e.g., the account number, expiration date, CVV, billing address, and/or shipping address) required to make a purchase using the account associated with the contactless card 101. However, in other embodiments, the individual elements of the data 103 may be incrementally copied to the clipboard 114 using one or more taps of the contactless card 101 and the mobile device 110. For example, a first tap of the contactless card 101 and the mobile device 110 may copy the account number of the data 103 to the clipboard 114, while a second tap of the contactless card 101 and the mobile device 110 may copy the expiration date to the clipboard 114, a third tap of the contactless card 101 and the mobile device 110 may copy the CVV to the clipboard 114, a fourth tap of the contactless card 101 may copy the shipping address to the clipboard 114, and a fifth tap of the contactless card 101 may copy the billing address to the clipboard 114. In one embodiment, a separate package of encrypted data 108 is generated by the contactless card 101 responsive to each tap, and the server 120 verifies each package of encrypted data 108 before copying the corresponding data 103 to the clipboard 114. In some embodiments, a single package of the encrypted data 108 is generated responsive to the initial tap and the server 120 verifies the single package of encrypted data 108. In some such embodiments, the account application 113 may receive the data 103 from the server 120 in a single package having delimiters and/or metadata that identifies each data element in the data 103 (e.g., the account number, expiration, date, CVV, billing address, and/or shipping address). The account application 113 may parse the data elements using the delimiters and/or metadata to extract each element of data from the single package of data 103 received from the server. The account application 113 may then copy the parsed data to the clipboard responsive to each tap of the contactless card 101 and the mobile device 110. In some such embodiments, the account application 113 may parse the data 103 based on the current fields displayed on the device 110. For example, if the account number field is current selected and/or displayed on the device 110, the account application 113 may parse the account number from the data 103 and copy the account number to the clipboard 114.

Furthermore, in some embodiments, the clipboard 114 may be hypertext markup language (HTML)-based. In such embodiments, the data 103 may be wrapped in HTML. For example, the account number may be wrapped in HTML indicating the presence of the account number. The expiration date, CVV, and addresses may similarly be wrapped in HTML. Therefore, when pasting from the clipboard 114, the HTML and the data 103 are pasted to the target (e.g., a form in the OS 112, account application 113, and/or the other applications 115). In at least one embodiment, the clipboard 114 and/or the OS 112 may parse the form in light of the data 103 and/or the generated HTML to associate the data 103 and/or generated HTML with the fields of the form. For example, doing so allows the account number, expiration date, CVV, billing address, and shipping address to be pasted into the correct fields of the form, even though the form may use different HTML tags for the fields.

Further still, the account application 113 and/or the OS 112 may manage the data 103 copied to the clipboard 114. For example, the data 103 may be deleted from the clipboard 114 after the data 103 has been stored in the clipboard 114 for a predefined amount of time. As another example, the data 103 may be deleted from the clipboard 114 after the data 103 has been used to make a purchase, e.g., after a threshold amount of time has elapsed since the data 103 has been used to make a purchase. In addition and/or alternatively, the clipboard 114 may be modified to remove the data 103, e.g., by copying random data to the clipboard 114.

FIG. 2 is a schematic 200 depicting an example embodiment of tapping to copy data to a clipboard via NFC. Generally, the schematic 200 depicts an embodiment where the account application 113 reads the data 103 directly from the contactless card 101 (e.g., via the card reader 118). As shown, the account application 113 on the mobile device 110 may specify to tap the contactless card 101 to the mobile device 110, e.g., responsive to receiving user input specifying to copy data from the contactless card 101 to the clipboard 114. Once the contactless card 101 is tapped to the mobile device 110, the account application 113 transmits, via the NFC card reader 118, an indication to the contactless card 101 to transmit the data 103. The contactless card 101 may then transmit the data 103 to the account application 113 via NFC. The account application 113 may then copy the received data 103 to the clipboard 114. As stated, the data 103 may include one or more of an account number, expiration date, and CVV. The data 103 may then be pasted from the clipboard 114 to any number and types of targets within the OS 112.

Figure 3B:
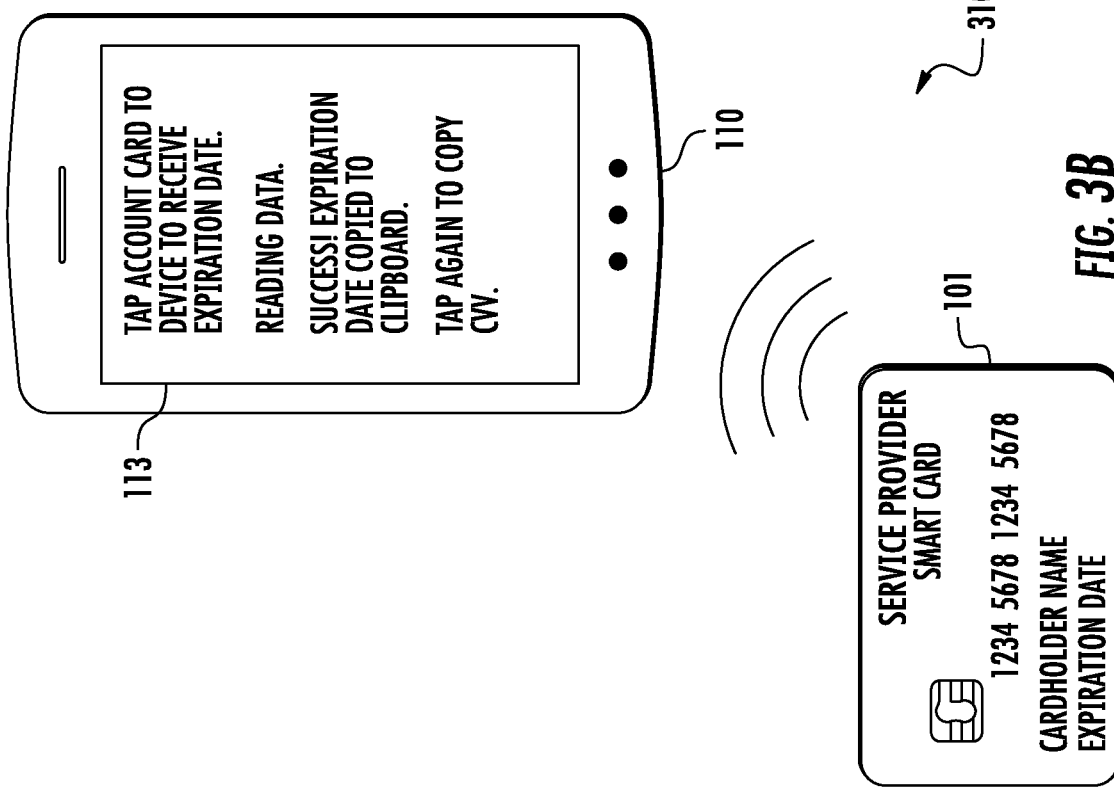
FIGS. 3A-3C illustrate embodiments of tapping to copy data to a clipboard via NFC.
Figure 3A:
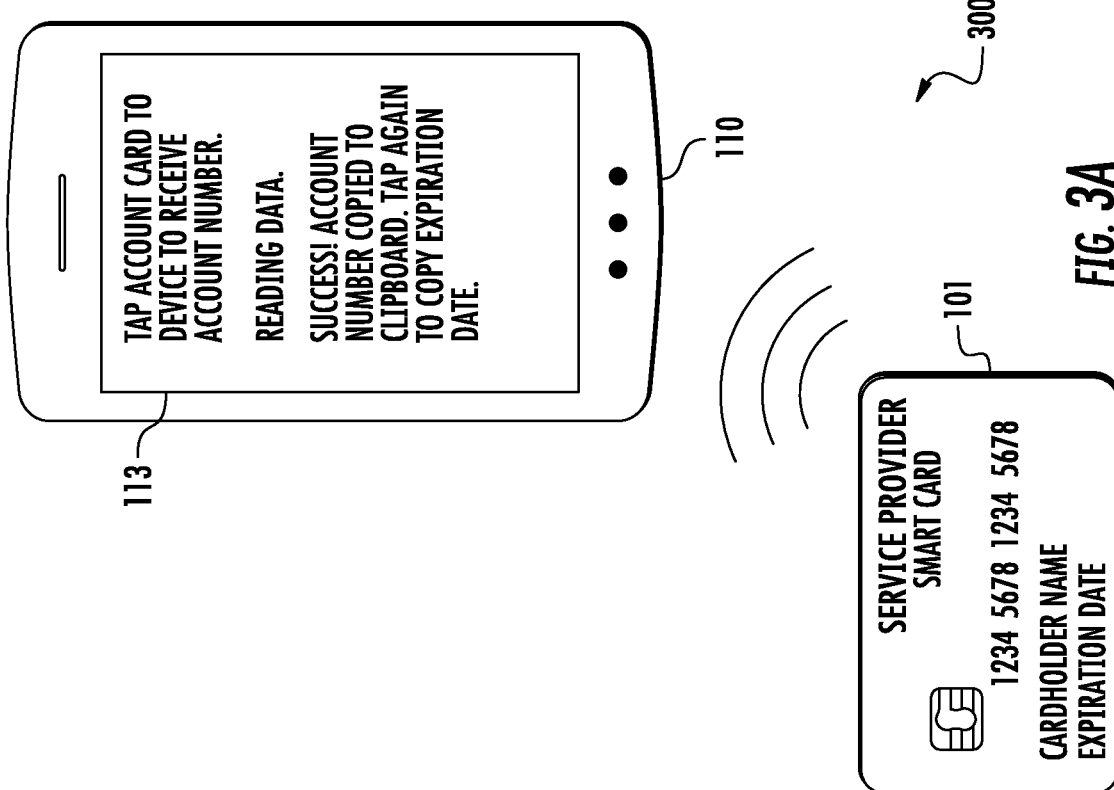

FIG. 3A is a schematic 300 depicting an example embodiment of tapping to copy data to a clipboard via NFC. Generally, FIG. 3A reflects an embodiment where a single tap is used to copy the account number of the data 103. As shown, the account application 113 on the mobile device 110 may specify to tap the contactless card 101 to the mobile device 110, e.g., responsive to receiving user input specifying to copy data 103 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the account number directly to the mobile device 110 via NFC, where the card reader 118 provides the received data to the account application 113, which then copies the account number to the clipboard 114. In such an embodiment, an applet of the contactless card 101 (e.g., an applet 440 of FIG. 4B) may maintain a counter value to determine to transmit the account number and increment the counter value responsive to each tap. In such an embodiment, at least one counter value is associated with transmitting the account number, at least one other counter value is associated with transmitting the expiration date, and at least one other counter value is associated with transmitting the CVV.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the account number to the account application 113, which then copies the account number to the clipboard 114.

Regardless of the technique used to copy the account number of the contactless card 101 to the clipboard 114, the user may then paste the account number as desired. Furthermore, if desired, the user may tap the contactless card 101 to the mobile device 110 an additional time to copy the expiration date of the contactless card 101 to the clipboard 114.

FIG. 3B is a schematic 310 depicting an example embodiment where the user has tapped the contactless card 101 to the mobile device 110 to copy the expiration date of the contactless card 101 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the expiration date directly to the mobile device 110 via NFC, where the account application 113 then copies the expiration date to the clipboard 114. In such an embodiment, the applet of the contactless card 101 may increment the counter value responsive to the tap and reference the counter value to determine to transmit the expiration date.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the expiration date to the account application 113, which then copies the expiration date to the clipboard 114. Doing so allows the user to paste the expiration date as desired. Furthermore, if desired, the user may tap the contactless card 101 to the mobile device 110 an additional time to copy the CVV of the contactless card 101 to the clipboard 114.

Figure 3C:
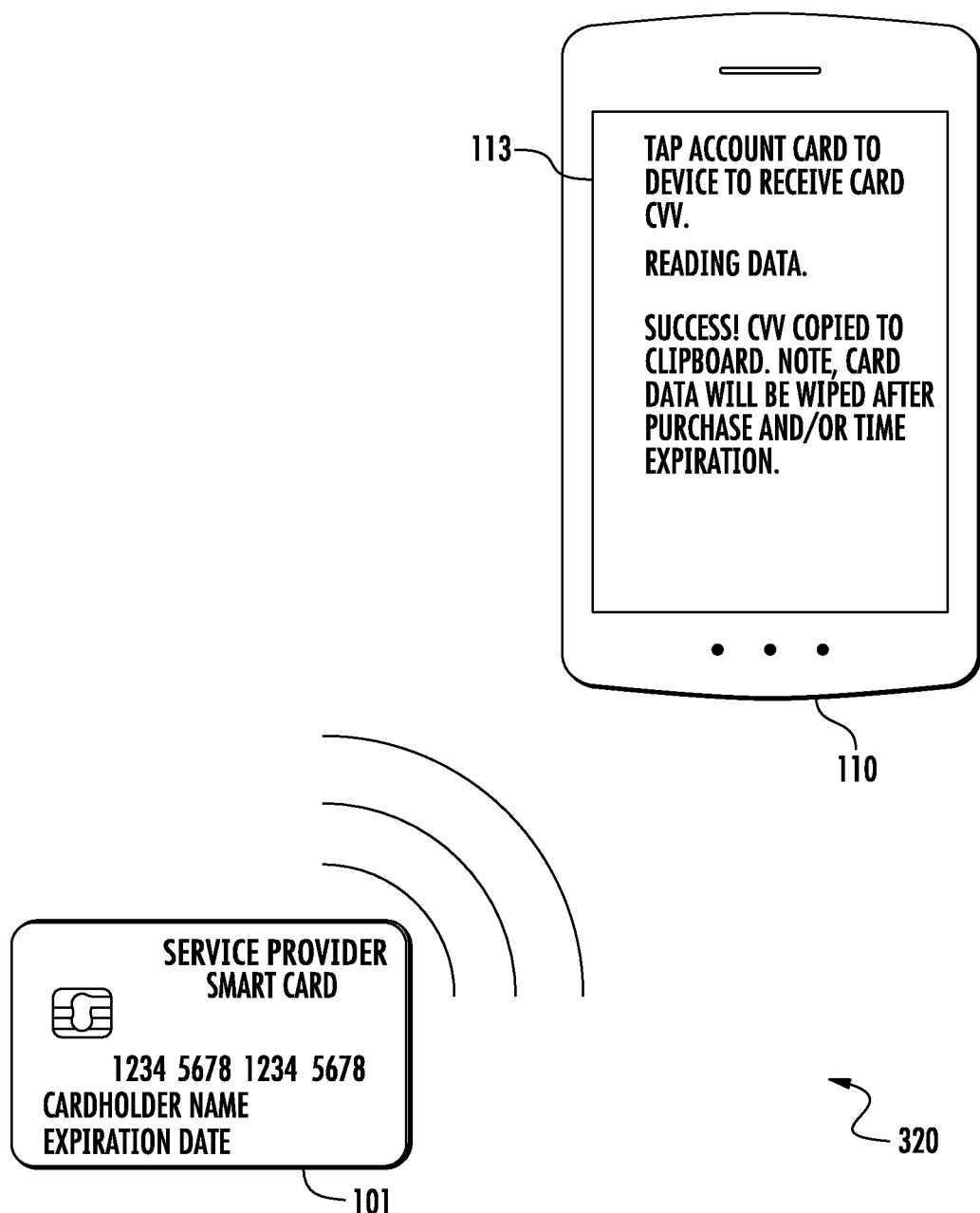

FIG. 3C is a schematic 320 depicting an example embodiment where the user has tapped the contactless card 101 to the mobile device 110 to copy the CVV of the contactless card 101 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the CVV directly to the mobile device 110 via NFC. The card reader 118 may then provide the CVV to the account application 113, which then copies the CVV to the clipboard 114. In such an embodiment, the applet of the contactless card 101 may increment the counter value responsive to the tap and reference the counter value to determine to transmit the CVV.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the CVV to the account application 113, which then copies the CVV to the clipboard 114. Doing so allows the user to paste the CVV as desired.

In some embodiments, the initial tap of the contactless card 101 to the mobile device 110 (e.g., the tap depicted in FIG. 3A) causes the contactless card 101 and/or the server 120 to transfer the account number, expiration date, and the CVV to the account application 113 (e.g., in an NDEF file). In such an embodiment, the account application 113 copies the account number from the NDEF file to the clipboard 114 responsive to the first tap. Responsive to the second tap, the account application 113 copies the expiration date from the NDEF file to the clipboard 114 without having to receive any additional data from the contactless card 101 and/or the server 120. Responsive to the third tap, the account application 113 copies the CVV from the NDEF file to the clipboard 114 without having to receive any additional data from the contactless card 101 and/or the server 120.

Figure 4A:
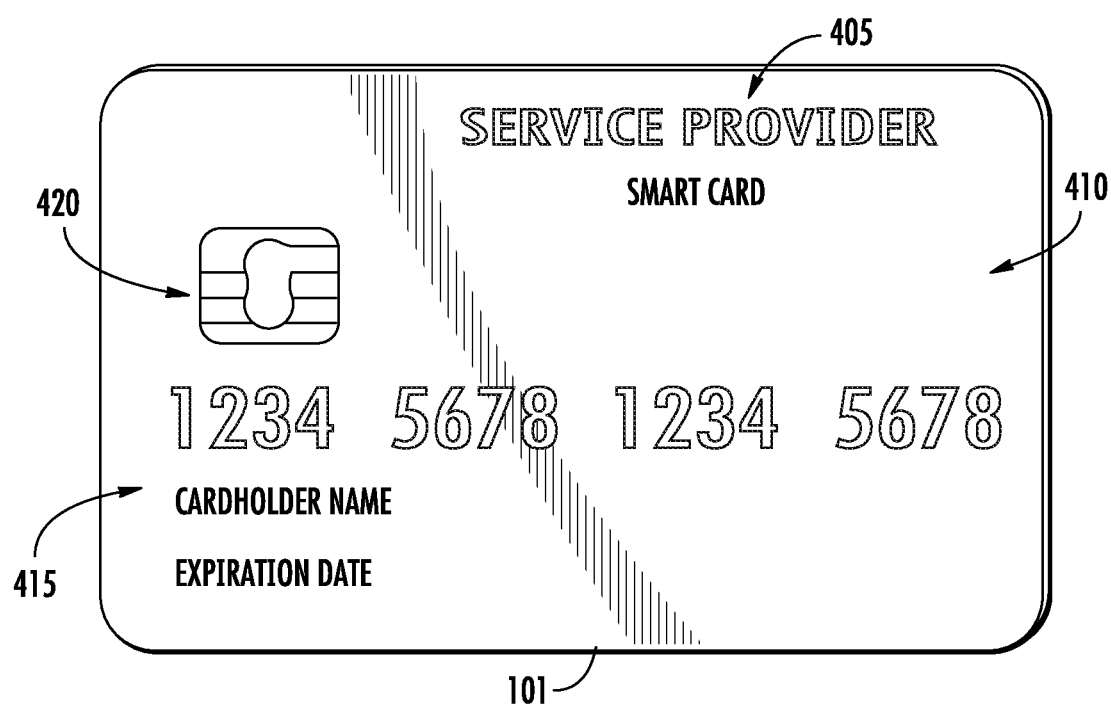
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
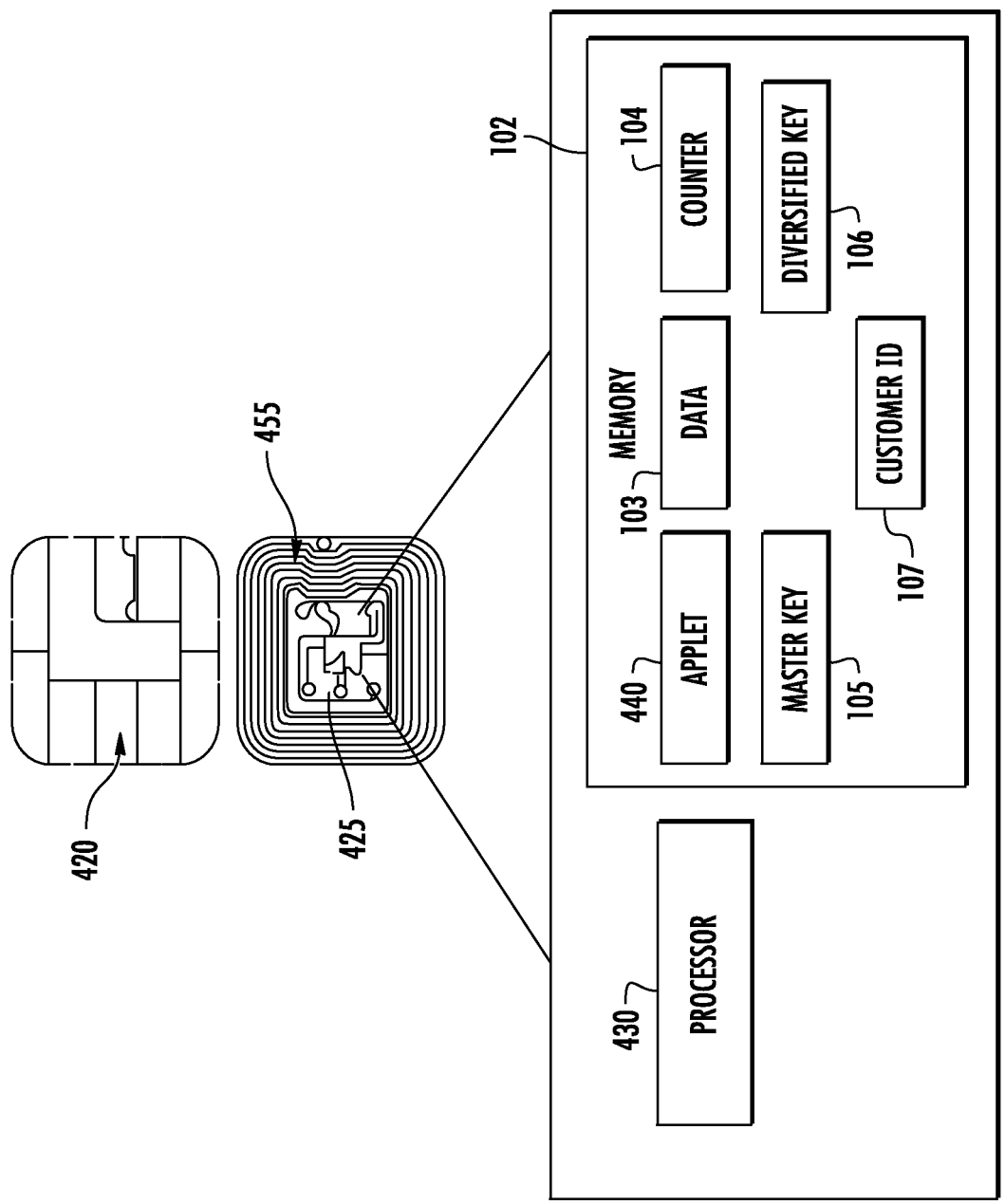

As illustrated in FIG. 4B, the contact pad 420 of FIG. 4A may include processing circuitry 425 for storing and processing information, including a microprocessor 430 and a memory 102. It is understood that the processing circuitry 425 may contain additional components, including processors, memories, error and parity/CRC checkers, data encoders, anticollision algorithms, controllers, command decoders, security primitives and tamperproofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to store one or more applets 440, one or more elements of data 103, one or more counters 104, a master key 105, a diversified key 106, and a customer identifier 107. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In some examples, the customer identifier 107 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In some examples, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

Figure 5:
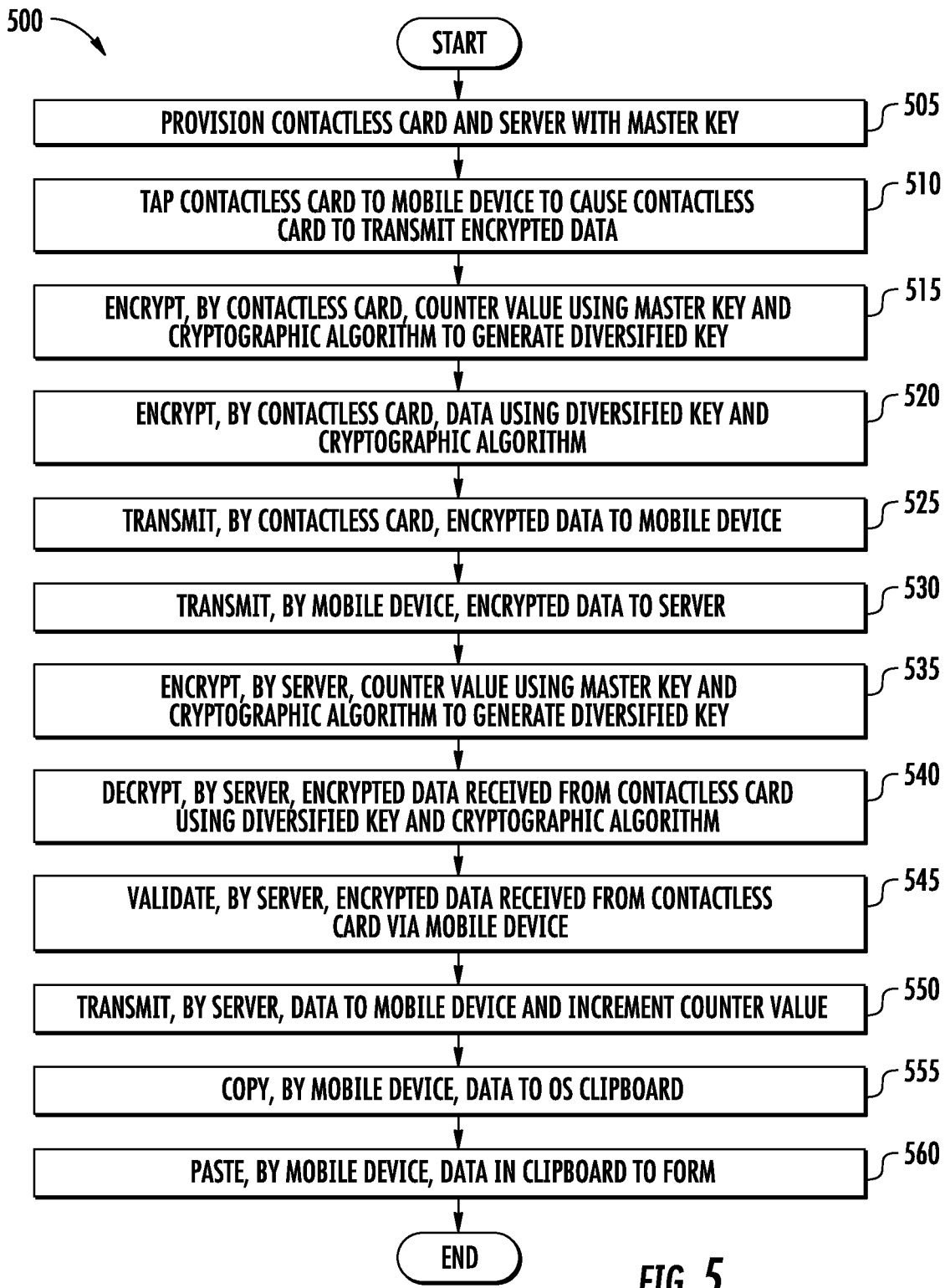
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to securely copy data associated with a contactless card 101 using key diversification. Embodiments are not limited in this context.

As shown, the logic flow 500 begins at block 505, where the contactless card 101 and the server 120 are provisioned with the same master key 105. At block 510, a user taps the contactless card 101 to the mobile device to cause the contactless card 101 to generate and transmit encrypted data (e.g., the encrypted data 108). The user may tap the contactless card 101 responsive to providing input to the account application 113 specifying to copy the data 103 to the clipboard. The account application 113 may transmit an indication to the contactless card 101 via the NFC card reader 118 specifying to generate and transmit encrypted data. The contactless card 101 may increment the counter value 104 in the memory 102 responsive to receiving the indication to generate encrypted data. At block 515, the contactless card 101 generates the diversified key 106 using the counter value 104 and the master key 105 in the memory 102 and a cryptographic algorithm. At block 520, the contactless card 101 encrypts data (e.g., the customer identifier 107) using the diversified key 106 and the cryptographic algorithm, generating encrypted data (e.g., the encrypted data 108).

At block 525, the contactless card 101 may transmit the encrypted data to the account application 113 of the mobile device 110 using NFC. In at least one embodiment, the contactless card 101 further includes an indication of the counter value 104 along with the encrypted data. At block 530, the account application 113 of the mobile device 110 may transmit the data received from the contactless card 101 to the management application 123 of the server 120. At block 535, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 540, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 545. For example, the management application 123 may compare the customer identifier 107 to a customer identifier for the associated account in the account data 124, and validate the data based on a match.

At block 550, the management application 123 may transmit data 103 associated with the contactless card 101 to the account application 113 of the mobile device 110. For example, the management application 123 may transmit the account number, expiration date, and CVV. In one embodiment, the management application 123 generates a virtual account number that is sent to the account application 113 of the mobile device 110. At block 555, the account application 113 of the mobile device 110 copies the data 103 received from the server 120 to the clipboard 114 of the OS 112. At block 560, the data 103 that has been copied to the clipboard 114 may be pasted to a form. The form may be a component of the account application 113, the other applications 115, and/or the OS 112.

Figure 6:
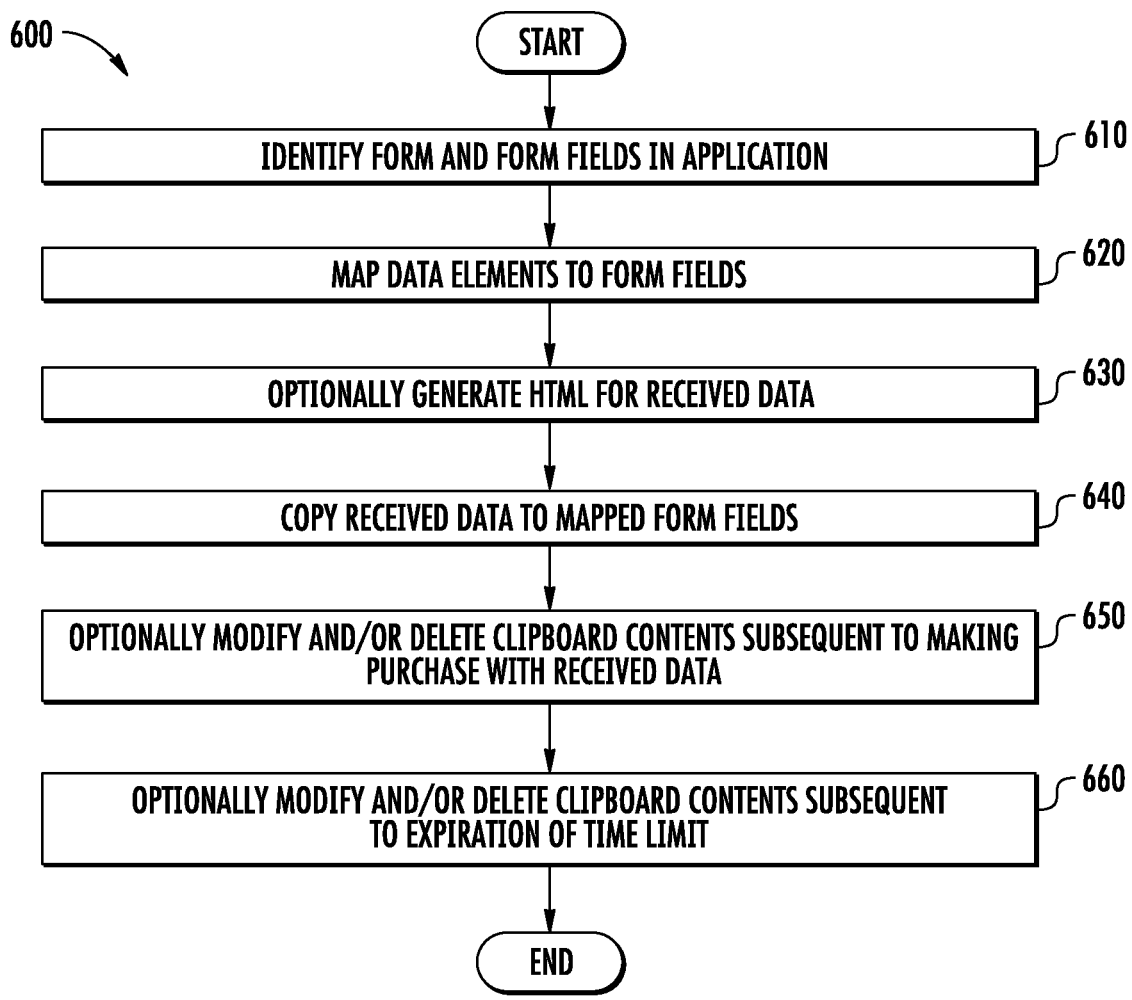
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to paste data from the clipboard 114 to an application form. Embodiments are not limited in this context.

As shown, the logic flow 600 begins at block 610, where the account application 113 and/or the OS 112 identifies a form comprising form fields in an application. The application may be the account application 113 and/or one or more of the other applications 115. For example, the account application 113 and/or the OS 112 may parse the source code of the form to identify the fields of the form. At block 620, the account application 113 and/or the OS 112 may map the elements of data 103 copied to the clipboard 114 (e.g., the account number, expiration date, and/or CVV) to a corresponding form field. For example, the account application 113 and/or the OS 112 may use fuzzy matching and/or rules to map the account number, expiration date, and CVV to the appropriate fields of the form.

At block 630, the account application 113 and/or the OS 112 may optionally generate HTML for the data 103 stored in the clipboard 114, thereby adding the HTML to the data 103 in the clipboard 114. Doing so may allow the account application 113 and/or the OS 112 to inject the data 103 into the form. At block 640, the account application 113 and/or the OS 112 copies the data 103 to the mapped form fields. At block 650, the account application 113 and/or the OS 112 may modify and/or delete the contents of the clipboard 114 subsequent to a purchase being made with the data 103 of the contactless card 101. At block 660, the account application 113 and/or the OS 112 may modify and/or delete the contents of the clipboard 114 subsequent to the expiration of a time limit for storing the data 103 in the clipboard 114. Doing so enhances the security of the data 103, such as account numbers, identification information, account information, etc.

Figure 7:
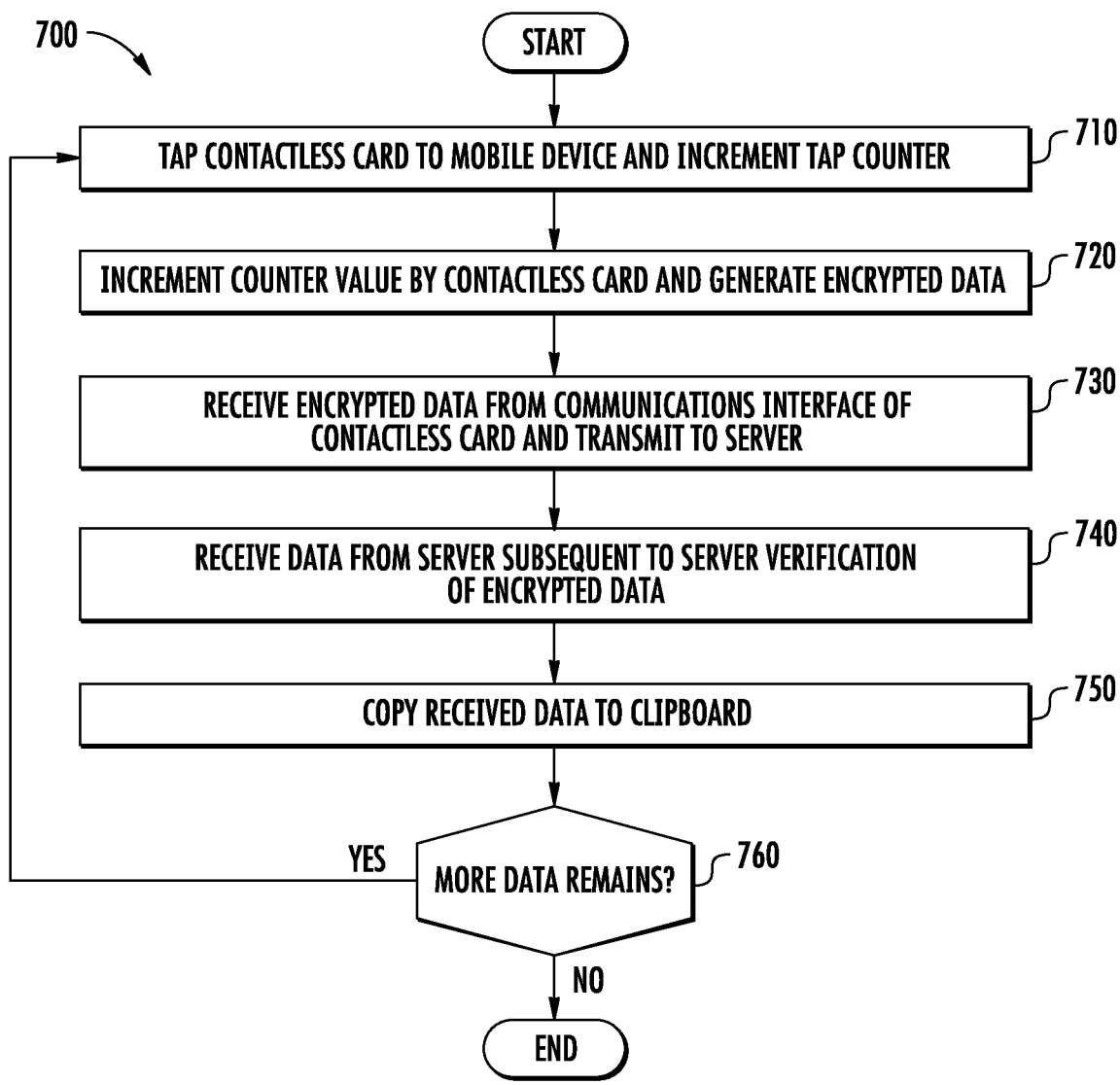
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to copy data 103 to a clipboard 114 using multiple taps of a contactless card 101 to a mobile device 110. Embodiments are not limited in this context.

As shown, the logic flow 700 begins at block 710, where the user taps the contactless card 101 to the mobile device 110. Doing so causes the account application 113 to transmit an indication to the contactless card 101 to generate encrypted data using key diversification. The account application 113 may further increment a tap counter responsive to the tap. At block 720, the contactless card 101 increments the counter value 104 and generate the encrypted data 108 as described above. At block 730, the account application 113 receives the encrypted data 108 from the contactless card 101 via NFC and transmits the encrypted data 108 to the server 120. The server 120 may then verify the encrypted data 108 using key diversification as described above. At block 740, the account application 113 receives the data 103 from the server 120 after the server 120 verifies the encrypted data 108. The data 103 may include one or more of the account number, expiration date, and CVV associated with the contactless card 101.

At block 750, the account application 113 may copy the data 103 to the clipboard 114. As stated, the account application 113 may paste one element of data based on the current value of the tap counter. For example, a counter value associated with a first tap of the contactless card 101 to the mobile device 110 may be associated with copying the account number to the clipboard 114. Similarly, a counter value associated with a second tap may be associated with copying the expiration date to the clipboard 114, while a counter value associated with a third tap may be associated with copying the CVV to the clipboard 114. At block 760, the account application 113 determines whether more data 103 remains. For example, if the tap counter indicates that the account number has been copied to the clipboard 114, the account application 113 may determine that the expiration date and/or the CVV remain to be copied to the clipboard 114. As such, the logic flow 700 returns to block 710. Otherwise, the logic flow 700 ends.

In some examples, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card 101 may be tapped to a device, such as the mobile device 110. As explained above, identity of the user may be verified by the one or more applications which would then grant the user a desired benefit based on verification of the identity.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. Some point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card 101 can selectively communicate information depending upon the recipient device. Once tapped, the contactless card 101 can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card 101, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards 101 to provide information to initiate one or more payment requests from the card-tapping individual.

In some examples, the present disclosure refers to a tap of the contactless card. However, it is understood that the present disclosure is not limited to a tap, and that the present disclosure includes other gestures (e.g., a wave or other movement of the card).

Figure 8:
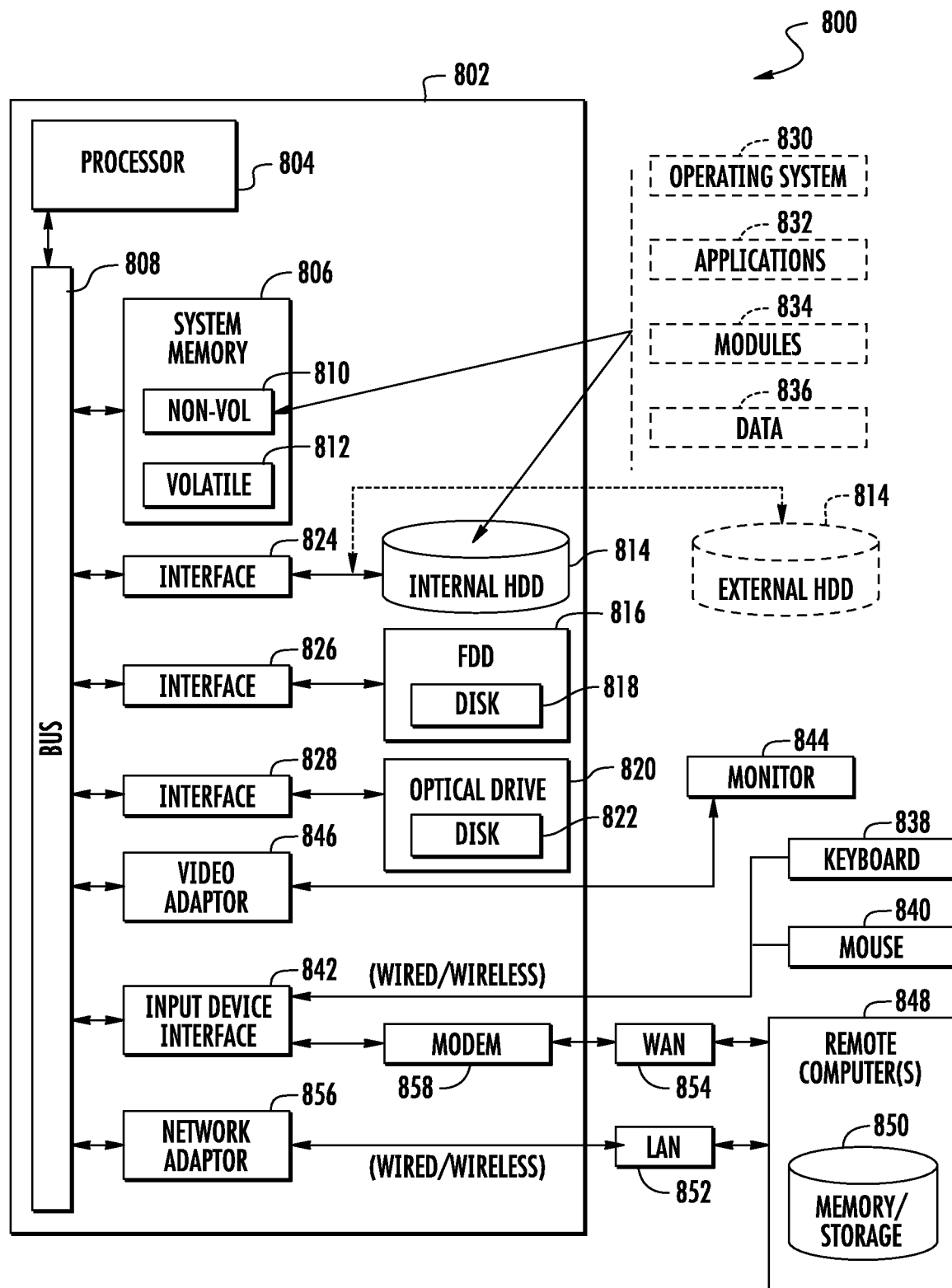
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the mobile devices 110 and server 120 of the system 100. The embodiments are not limited in this context. More generally, the computing architecture 800 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the operating system 112, account application 113, clipboard 114, other applications 115, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
   a mobile device comprising a processor and a memory;
   contactless card comprising a processor and a memory; and
   a server communicatively coupled to the mobile device;
   wherein the contactless card processor encrypts data associated with an account in the memory of the contactless card, wherein the contactless card generates the encrypted data using a diversified key obtained by providing a master key and a counter value stored in the memory of the contactless card as input to a cryptographic algorithm, and wherein the contactless card sends the encrypted data to the mobile device responsive to a first tap of the contactless card to the mobile device;
   wherein the server receives the counter value and encrypted data sent from the mobile device, decrypts the encrypted data using the diversified key, and sends an indication to the mobile device that the encrypted data was decrypted;
   wherein the server encrypts an account number associated with the account and sends the encrypted account number to the mobile device after the decrypting;
   wherein an application executing on the mobile device decrypts the encrypted account number to yield the account number;
   wherein the contactless card sends an expiration date associated with the account number to the mobile device responsive to a second tap of the contactless card to the mobile device;
   wherein the contactless card sends a card verification value (CVV) associated with the account number to the mobile device responsive to a third tap of the contactless card to the mobile device, wherein a tap counter counts a number of taps of the card to the mobile device, and wherein the encrypted data, expiration date, and CVV are sent by the contactless card based on the number of taps counted by the tap counter;
   wherein the application copies the decrypted account number, expiration date, and CVV as information to a clipboard on an operating system (OS) executing on the mobile device; and
   wherein the mobile device removes the clipboard information after the mobile device makes a purchase using the clipboard information or after a time threshold expires.

2. The system of claim 1, wherein the mobile device:
   identifies a form comprising a plurality of fields including a first field, a second field, and a third field; and determines that the first field is associated with the account number, the second field is associated with the expiration date, and the third field is associated with the CVV.

3. The system of claim 2, wherein the mobile device pastes, from the clipboard: (i) the account number to the first field, (ii) the expiration date to the second field, and (iii) the CVV to the third field.

4. The system of claim 1, wherein the mobile device removes the clipboard information by erasing all data stored in the clipboard.

5. The system of claim 1, wherein the mobile device removes the clipboard information by copying other data to the clipboard.

6. The system of claim 1, wherein the account number comprises a virtual account number.

7. The system of claim 1, wherein the data associated with the account in the memory of the contactless card comprises at least a customer identification value.

8. A method, comprising:
- encrypting, by a processor of a contactless card, data associated with an account in a memory of the contactless card, wherein the contactless card encrypts the data using a diversified key obtained by providing a master key and a counter value stored in the memory of the contactless card as input to a cryptographic algorithm, and wherein the contactless card sends the encrypted data to a mobile device comprising a processor and a memory responsive to a first tap of the contactless card to the mobile device;
- receiving, by a server, the counter value and encrypted data from the mobile device;
- decrypting, by the server, the encrypted data using the diversified key;
- transmitting, by the server, an indication to the mobile device that the encrypted data was decrypted;
- encrypting, by the server, an account number associated with the account;
- sending, by the server, the encrypted account number to the mobile device after the decrypting;
- decrypting, by an application executing on the mobile device, the encrypted account number to yield the account number;
- sending, by the contactless card, an expiration date associated with the account number to the mobile device responsive to a second tap of the contactless card to the mobile device;
- sending, by the contactless card, a card verification value ((NV) associated with the account number to the mobile device responsive to a third tap of the contactless card to the mobile device, wherein a tap counter counts a number of taps of the card to the mobile device, and wherein the encrypted data, expiration date, and CVV are sent by the contactless card based on the number of taps counted by the tap counter;
- copying, by the application, the decrypted account number, expiration date, and CVV as information to a clipboard on an operating system (OS) executing on the mobile device; and
- removing, by the mobile device, the clipboard information after the mobile device makes a purchase using the clipboard information or after a time threshold expires.

9. The method of claim 8, further comprising:
- identifying, by the mobile device, a form comprising a plurality of fields including a first field, a second field, and a third field; and
- determining, by the mobile device, that the first field is associated with the account number, the second field is associated with the expiration date, and the third field is associated with the CVV.

10. The method of claim 9, further comprising:
- pasting, by the mobile device from the clipboard: (i) the account number to the first field, (ii) the expiration date to the second field, and (iii) the CVV to the third field.

11. The method of claim 8, wherein the mobile device removes the clipboard information by erasing all data stored in the clipboard.

12. The method of claim 8, wherein the mobile device removes the clipboard information by copying other data to the clipboard.

13. The method of claim 8, wherein the account number comprises a virtual account number.

14. The method of claim 8, wherein the data associated with the account in the memory of the contactless card comprises at least a customer identification value.

15. A non-transitory computer-readable storage medium storing computer-readable instructions executable by a system to cause the system to perform the steps of:
- encrypting, by a processor of a contactless card of the system, data associated with an account in a memory of the contactless card, wherein the contactless card encrypts the data using a diversified key obtained by providing a master key and a counter value stored in the memory of the contactless card as input to a cryptographic algorithm, and wherein the contactless card sends the encrypted data to a mobile device of the system responsive to a first tap of the contactless card to the mobile device, the mobile device comprising a processor and a memory;
- receiving, by a server of the system, the counter value and encrypted data from the mobile device;
- decrypting, by the server, the encrypted data using the diversified key;
- transmitting, by the server, an indication to the mobile device that the encrypted data was decrypted;
- encrypting, by the server, an account number associated with the account;
- sending, by the server, the encrypted account number to the mobile device after the decrypting;
- decrypting, by an application executing on the mobile device, the encrypted account number to yield the account number;
- sending, by the contactless card, an expiration date associated with the account number to the mobile device responsive to a second tap of the contactless card to the mobile device;
- sending, by the contactless card, a card verification value (CVV) associated with the account number to the mobile device responsive to a third tap of the contactless card to the mobile device, wherein a tap counter counts a number of taps of the card to the mobile device, and wherein the encrypted data, expiration date, and CVV are sent by the contactless card based on the number of taps counted by the tap counter;
- copying, by the application, the decrypted account number, expiration date, and CVV as information to a clipboard on an operating system (OS) executing on the mobile device; and
- removing, by the mobile device, the clipboard information after the mobile device makes a purchase using the clipboard information or after a time threshold expires.

16. The computer-readable storage medium of claim 15, storing computer-readable instructions executable by the system to cause the system to perform the steps of:
- identifying, by the mobile device, a form comprising a plurality of fields including a first field, a second field, and a third field; and
- determining, by the mobile device, that the first field is associated with the account number, the second field is associated with the expiration date, and the third field is associated with the CVV.

17. The computer-readable storage medium of claim 16, storing computer-readable instructions executable by the system to cause the system to perform the step of:
- pasting, by the mobile device from the clipboard: (i) the account number to the first field, (ii) the expiration date to the second field, and (iii) the CVV to the third field.

18. The computer-readable storage medium of claim 15, Wherein the mobile device removes the clipboard information by erasing all data stored in the clipboard.

19. The computer-readable storage medium of claim 15, wherein the mobile device removes the clipboard information by copying other data to the clipboard.

20. The computer-readable storage medium of claim 15, wherein the account number comprises a virtual account number, wherein the data associated with the account in the memory of the contactless card comprises at least a customer identification value.

* * * * *

UNITED STATES PATENT AND TRADEMARK OFFICE
CERTIFICATE OF CORRECTION

PATENT NO. : 10,783,736 B1
APPLICATION NO. : 16/522380
DATED : September 22, 2020
INVENTOR(S) : Daniel Herrington et al.

Page 1 of 1

It is certified that error appears in the above-identified patent and that said Letters Patent is hereby corrected as shown below:

In the Claims

Column 22, Claim 1, Line 21; Please replace "contactless card comprising" with --a contactless card comprising--

Column 23, Claim 8, Line 50; Please replace "((NV) associated with the account" with --(CVV) associated with the account--

Column 25, Claim 18, Line 18; Please replace "Wherein the mobile device removes" with --wherein the mobile device removes--

Signed and Sealed this
Tenth Day of November, 2020

Andrei Iancu
*Director of the United States Patent and Trademark Office*